(12) United States Patent
Idetsu et al.

(10) Patent No.: US 6,678,956 B2
(45) Date of Patent: Jan. 20, 2004

(54) METHOD OF PRODUCING SPRAY DEPOSIT ON BEARING BOSS

(75) Inventors: Wataru Idetsu, Chiyoda-machi (JP); Ryohei Suzuki, Yasato-machi (JP); Osamu Gokita, Chiyoda-machi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 85 days.

(21) Appl. No.: 09/980,086

(22) PCT Filed: Apr. 11, 2001

(86) PCT No.: PCT/JP01/03125

§ 371 (c)(1),
(2), (4) Date: Nov. 30, 2001

(87) PCT Pub. No.: WO01/88217

PCT Pub. Date: Nov. 22, 2001

(65) Prior Publication Data

US 2002/0162225 A1 Nov. 7, 2002

(30) Foreign Application Priority Data

May 19, 2000 (JP) .......................................... 2000-147795

(51) Int. Cl.[7] ................................................ C23C 4/00
(52) U.S. Cl. ............................... 29/898.12; 29/898.13; 29/898.042; 29/423; 29/424; 29/527.4; 29/898; 427/282; 427/448
(58) Field of Search ......................... 29/898.12, 898.13, 29/418, 423, 424, 527.1, 527.2, 527.4, 898, 898.042; 427/446, 448, 450, 451, 453, 455, 456, 282

(56) References Cited

U.S. PATENT DOCUMENTS 2,931,764 A * 5/1960 Pyles
3,918,137 A * 11/1975 Telang et al.
4,988,534 A * 1/1991 Upadhya
5,107,589 A * 4/1992 Nisley
6,017,184 A * 1/2000 Aguilar et al.

FOREIGN PATENT DOCUMENTS

| DE | 2034180 | * 1/1971 |
| JP | 60-85626 | 6/1985 |
| JP | 9-184518 | 7/1997 |

* cited by examiner

*Primary Examiner*—Gregory Vidovich
*Assistant Examiner*—Eric Compton
(74) *Attorney, Agent, or Firm*—Mattingly, Stanger & Malur, P.C.

(57) ABSTRACT

Prior to forming a thermal spray coating layer (28) on an end face (23B') of a structural base material (23') to be shaped into a boss, firstly an inner masking member (32) is fitted in an original hole (23A') of the structural base material (23') and then an outer masking member (33) is fitted on outer peripheral side of the structural base material (23'). In the next place, by the use of a hard material, a thermal spray coating layer (28) is formed on an annular coating area (23B1') which is exposed between the inner and outer masking members (32) and (33). Surface areas on the end face (23B') of the structural base material (23'), corresponding to an allowance range of a machining operation by which the original hole (23A') is ultimately shaped into a joint pin hole of a specified diameter, are left as a non-coating area (23B2') free of the thermal spray coating layer (28). Therefore, the original hole (23A') in the structural base material (23') can be machined into a final joint pin hole by means of a cutting tool, without experiencing cracking troubles which would otherwise occur to the thermal spray coating layer (28) during the machining operation.

14 Claims, 9 Drawing Sheets

METHOD OF PRODUCING SPRAY DEPOSIT ON BEARING BOSS

TECHNICAL FIELD

This invention relates to a method for manufacturing a bearing boss with a thermal spray coating layer, which can be suitably used, for example, at a pivotal pin joint portion of a working mechanism of a construction machine or the like.

BACKGROUND ART

Generally, construction machines such as hydraulic power shovel type excavator machines, for example, are equipped with a working mechanism for ground excavating operations or for performing other ground working jobs. The working mechanisms of this sort generally have a boom, an arm and a bucket which are pivotally connected with each other through a bearing device.

More particularly, in the case of a hydraulic power shovel type excavator, for example, a boss is provided at a fore end of an arm, which is one of two members to be pivotally connected to each other. while a pair of brackets are provided on the part of a bucket or the other one of the two members to be pivotally connected. The boss is fitted between the paired brackets, and pivotally connected to the latter by the use of a joint pin. A bush is fitted in a joint pin hole in the boss, and the joint pin is slidably received and supported in the bush on the inner peripheral side of the boss.

Further, according to a prior art arrangement, end faces of the boss are held in sliding contact with end faces of the brackets thereby to support thrust loads, which are exerted on the bucket during an excavating operation.

In the case of a prior art machine which is arranged to handle a large amount of soil or dirt by the bucket each time, it is inevitable that soil frequently gets into small clearances between the boss and the brackets. Rotations of the bucket in this state invariably result in accelerated abrasive wear of end faces of the boss due to abrasion by dirt.

Regarding other prior art bearing devices of this sort, for instance, there has been known in the art a bearing device as described in Japanese Laid-Open Patent No. H9-184518. In this case, in order to enhance resistance to abrasive wear, a hard material, for example tungsten carbide, is provided on end faces of a boss which are in contact with brackets.

In the case of the prior art just mentioned, a bush is fitted in a joint-pin hole on the inner peripheral side of the boss by press-in fitting for slidably supporting a joint pin therein. In this case, however, high precision machining is required in shaping a joint pin hole in the boss according to the outside diameter of the bush.

In this regard, according to this prior art arrangement, in order to form a joint pin hole of high precision, an original hole on the inner peripheral side of a structural base material for a boss unit is subsequently machined precisely to a specified diameter by a finish machining operation.

However, in a case where a hard thermal spray coating layer is formed on the entire end faces of a boss in the manner as in the bearing device of the second prior art mentioned above, a number of problems arise at the time of finishing a joint pin hole in a subsequent precision machining stage, as described below.

Namely, at the time of machining an original hole of a structural base material for a boss unit into a joint pin hole subsequently to forming thermal spray coating layers on its end faces, part of the thermal spray coating layers need to be removed along with stock of the base material depending on an allowance range in the machining operation. Upon partial removal, cracking, defoliation or other damages however are likely to occur to the hard thermal spray coating layers on the boss. In addition, there arises another problem that the service life of a cutting tool can be shortened to a considerable degree by machining the thermal spray coating layers.

DISCLOSURE OF THE INVENTION

In view of the problems with the prior art devices, it is an object of the present invention to provide a method for manufacturing a bearing boss with a thermal spray coating layer, which can prevent cracking or damages as would normally occur to a thermal spray coating layer on an end face of an annular structural base material of a boss when machining an original hole in the structural base material into a final joint pin hole of a specified diameter, and which can contribute to improve the quality of the thermal spray coating layer.

According to the present invention, in order to achieve the above-stated objective, there is provided a method for manufacturing a bearing boss with a thermal spray coating layer, comprising the steps of: preparing a structural base material for a boss, the structural base material having an annular body and containing an original hole to be ultimately into a joint pin hole of a predetermined diameter; masking an end face of the structural base material on surface areas corresponding to an allowance range of a machining operation; and forming a thermal spray coating layer on unmasked surface areas on the end face of the structural base material by the use of cemented carbide material.

With the arrangements just described, at the time of forming a thermal spray coating layer of a hard material on an end face of a bearing boss, an end face of an annular structural base material for a boss unit is masked as a non-coating surface area in those portions corresponding to an allowance range of a machining operation by which an original hole in the structural base material is ultimately shaped into a joint pin hole of a predetermined diameter. Accordingly, a subsequent machining operation on the original hole in the structural base material does not require to remove part of the hard thermal spray coating layer along with stock of the base material, permitting to shape the original hole into a joint pin hole of a specified diameter in a facilitated manner.

Further, according to the present invention, an inner masking member is fitted in the original hole of the structural base material at the time of masking the end face thereof, and a thermal spray coating layer of a hard material is formed on an annular surface area circumventing outer periphery of the inner masking member.

In this case, an inner masking member is fitted in an original hole in an annular structural base material for a boss unit, and in this state a thermal spray coating layer of a hard material is formed on the end face of the structural base material. Therefore, a thermal spray coating layer is formed on the end face of the structural base material only on an annular coating area which circumvents the inner masking member.

Further, according to the present invention, inner and outer masking members are fitted in or on inner and outer peripheral sides of the structural base material at the time of masking the end face, and a thermal spray coating layer of a hard material is formed on the end face on an annular surface area between the inner and outer masking members.

In this case, an inner masking member is fitted in an original hole in an annular structural material for a boss unit while an outer masking member is fitted on outer peripheral side of the structural base material, and in this state a thermal spray coating layer of a hard material is formed on the end face of the structural base material only on an annular surface area which is exposed between the inner and outer masking members.

Further, according to the present invention, the inner masking member is arranged to have a masking portion with an outside diameter larger than a joint pin hole to be ultimately formed by machining an original hole in the base material.

Alternatively, according to the present invention, the inner masking member is arranged to have a masking portion with an outside diameter larger than an allowance range in a machining operation by which an original hole in the structural base material is ultimately formed into a joint pin hole of a predetermined diameter.

Therefore, in a stage of machining a joint pin hole, the machining operation does not require to remove part of the hard thermal spray coating layer along with stock of the structural base material, and the original hole in the structural base material can be easily machined by the use of a cutting tool.

BEST MODE FOR CARRYING OUT THE INVENTION

Figure 1:
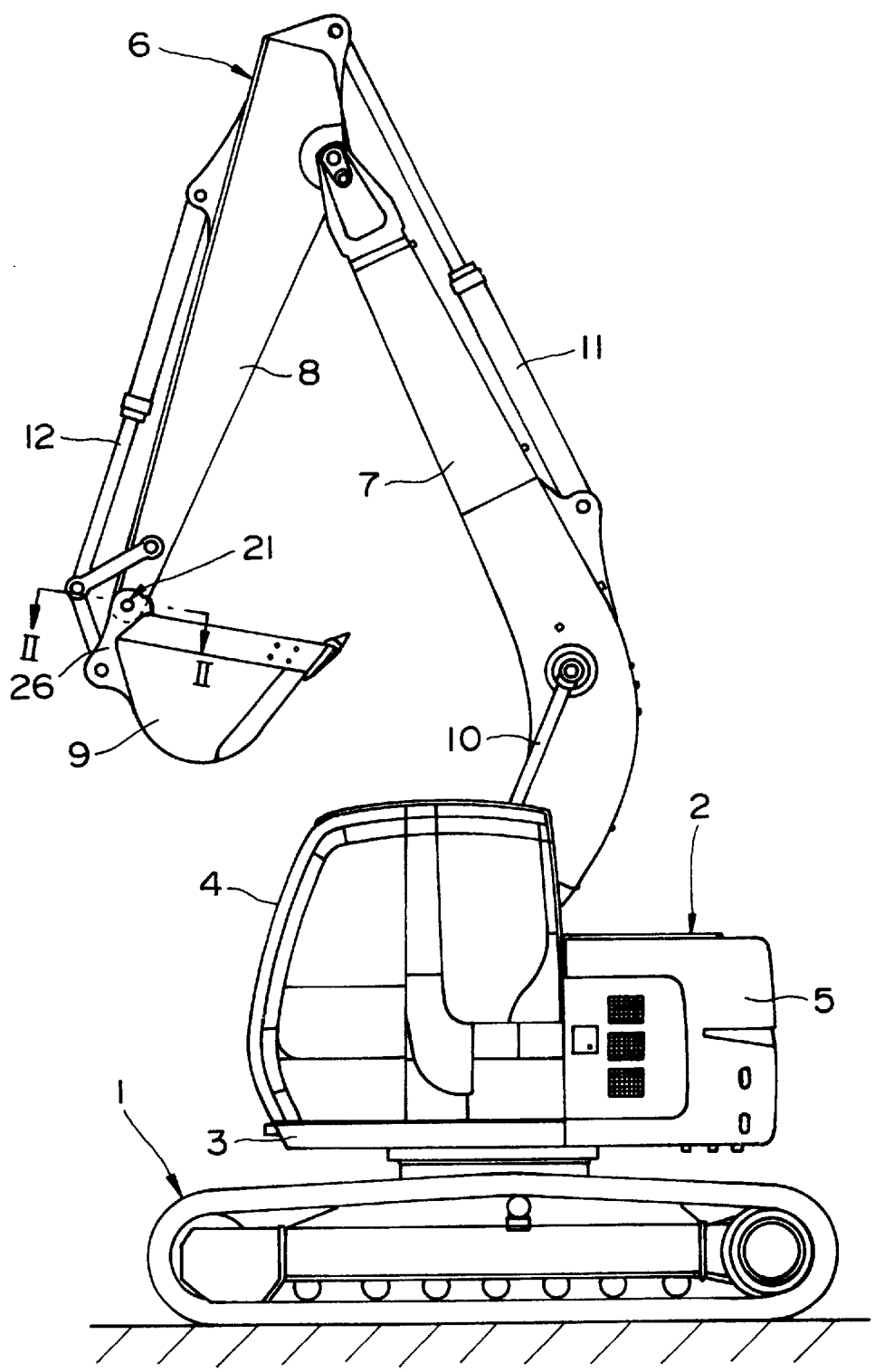
FIG. 1 is an outer view of a hydraulic power shovel type excavator incorporating a bearing device according to the present invention.

Hereafter, the present invention is described more particularly by way of its preferred embodiments with reference to FIGS. 1 through 10, in which a bearing device according to the invention is applied by way of example to a pivotal pin joint of a hydraulic power shovel type excavator.

In the drawings, indicated at 1 is a lower traveling structure of an excavator, and at 2 is an upper revolving structure which is rotatably mounted on the lower traveling structure 1. The upper revolving structure 2 is provided with a revolving frame 3. A cab 4 which defines an operating room and a counterweight 5 are mounted on the revolving frame 3.

Denoted at 6 is a working mechanism which is provided on a front portion of the upper revolving structure 2 for lifting loads up and down. The working mechanism 6 is largely constituted by a boom 7 which is connected to the revolving frame 3 through a pivotal pin joint, an arm 8 which is connected to a fore end portion of the boom 7 through a pivotal pin joint, and a bucket 9 which is connected to a fore end portion of the arm 8 through a pivotal pin joint. The boom 7 of the working mechanism 6 is lifted up and down by means a boom cylinder 10, the arm 8 is turned up and down relative to the boom 7 by an arm cylinder 11, and the bucket 9 is turned up and down relative to the arm 8 by a bucket cylinder 12.

Indicated at 21 is a bearing device which is provided at a pivotal pin-joint of the arm 8 and the bucket 9. The bearing device 21 is largely constituted by an arm boss 22, brackets 26 and a joint pin 27 which will be described below.

Figure 2:
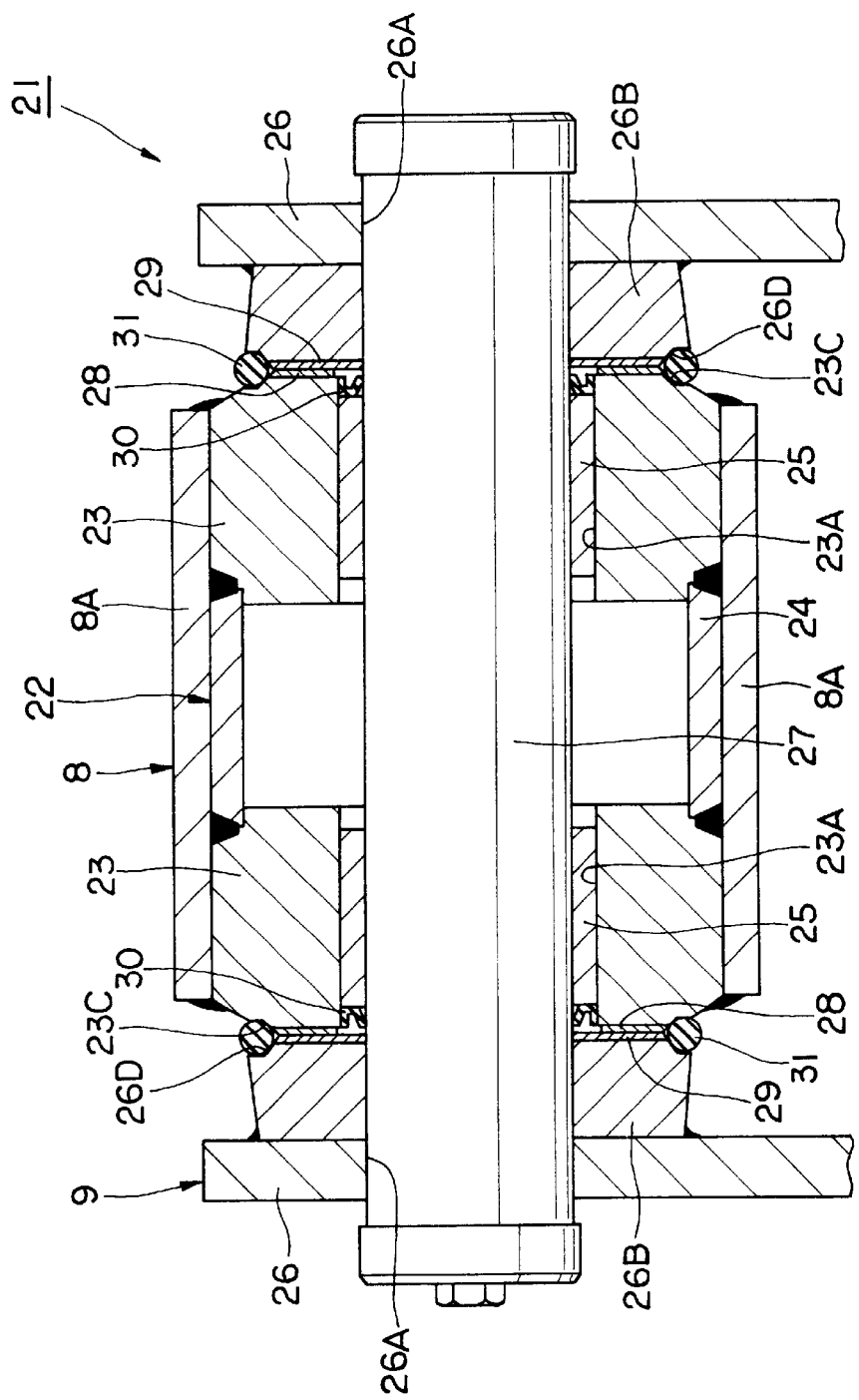
FIG. 2 is an enlarged vertical sectional view of the bearing device, taken in the direction of arrows II—II of FIG. 1
Figure 10:
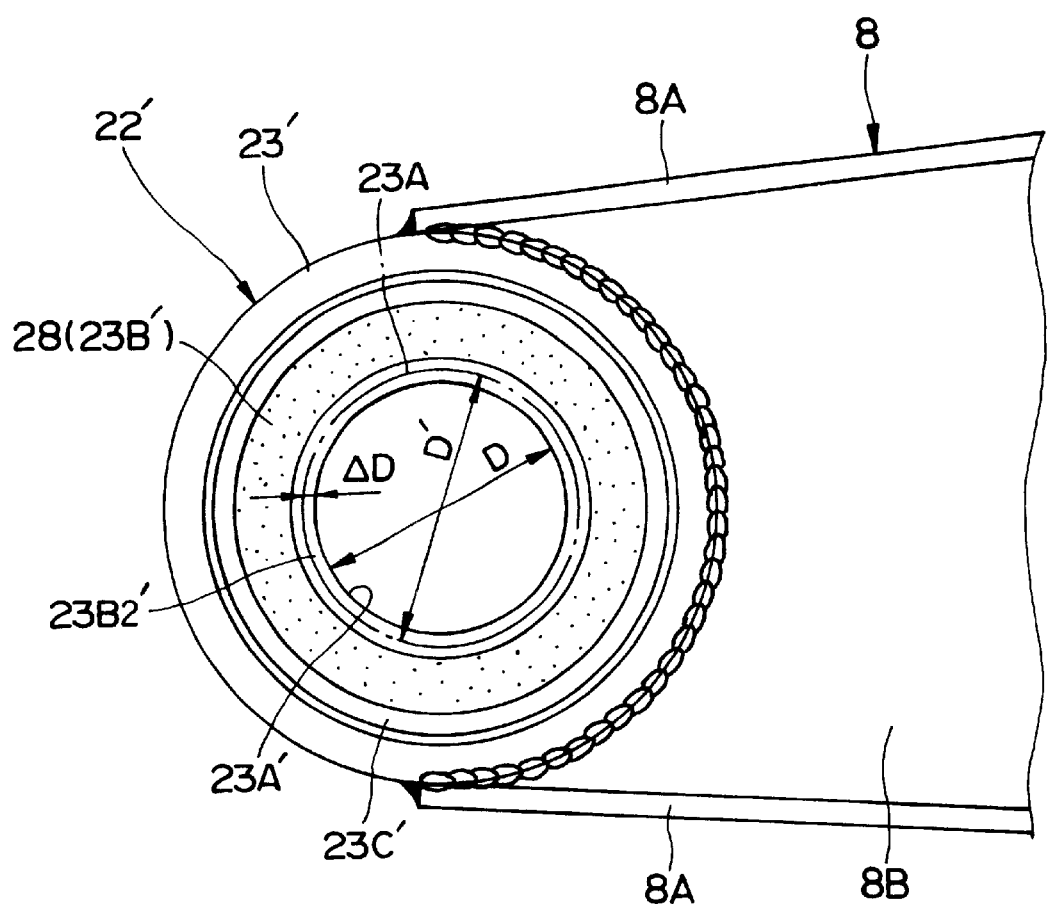
FIG. 10 is a side of an arm boss welded to an arm member of a working mechanism in a second welding stage.

The arm boss 22 is provided on a fore end portion of the arm 8 to serve as a bearing boss, and securely welded to fore end portions of upper and lower flanges 8A and to right and left webs 8B of the arm 8 (FIG. 10). In this instance, as shown in FIGS. 2 and 3. the arm boss 22 is constituted by a pair of right and left boss units 23 which are located in axially spaced positions, and a bridge ring 24 which connects the right and left boss units 23 securely to each other.

Figure 3:
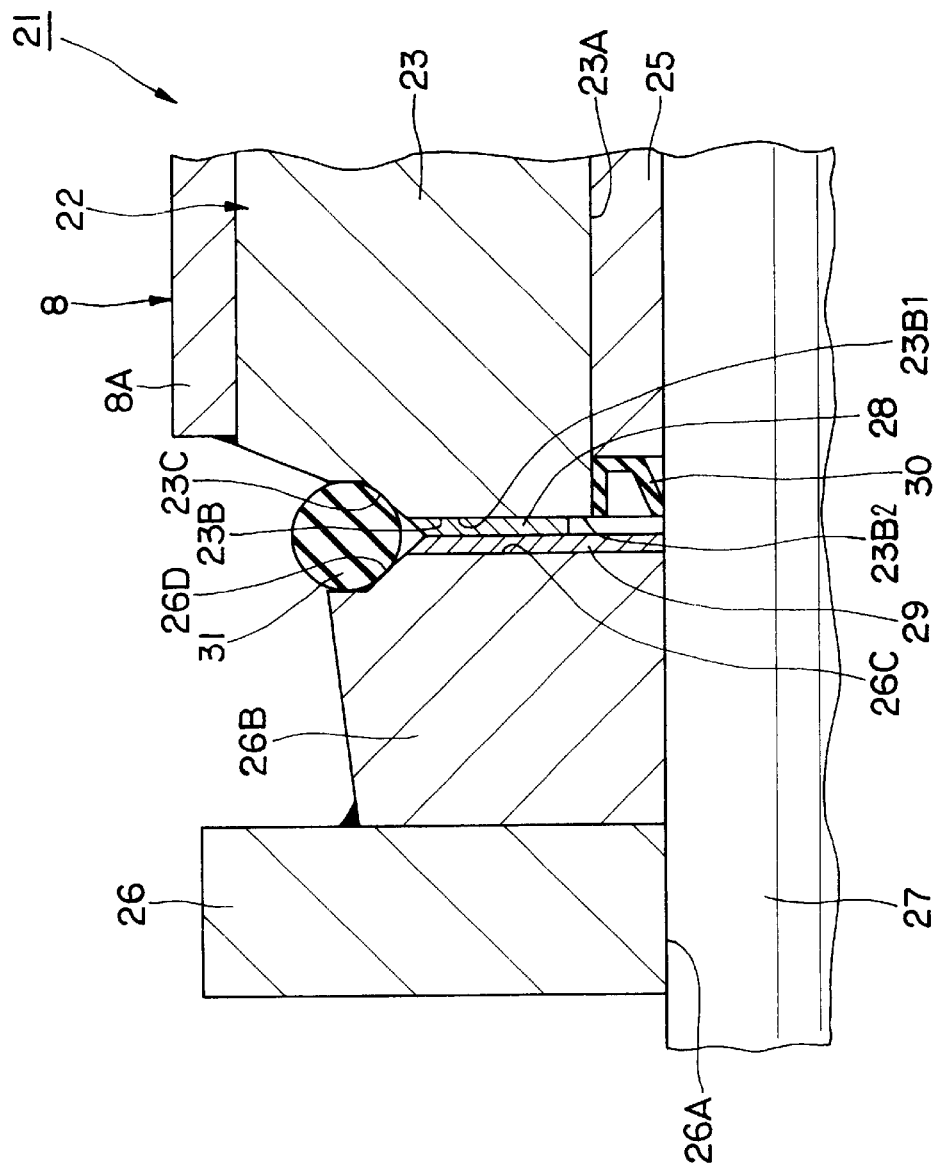
FIG. 3 is a fragmentary sectional view, showing on an enlarged scale an arm boss, a bracket and thermal spray coating layers in FIG. 2.
Figure 4:
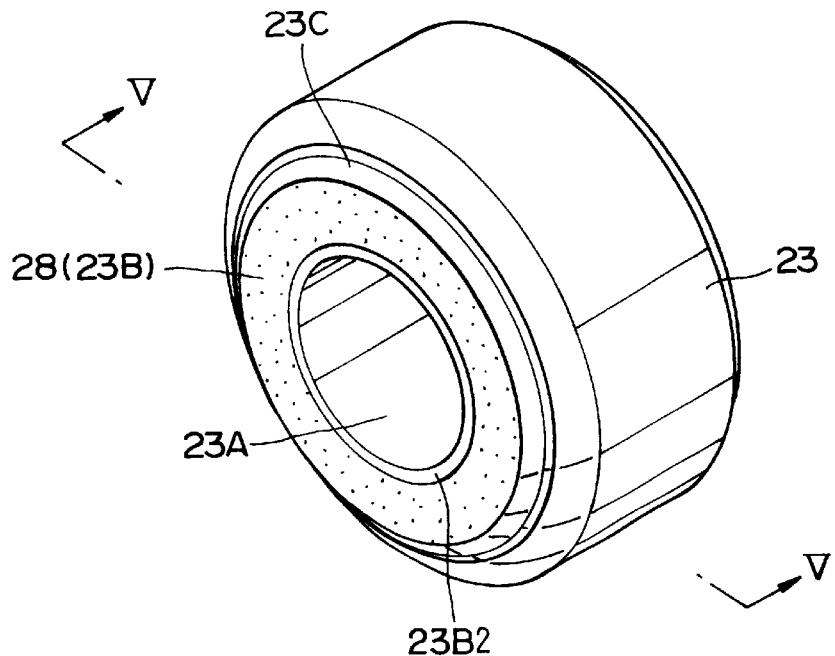
FIG. 4 is an enlarged perspective view of the boss in a separated state.
Figure 5:
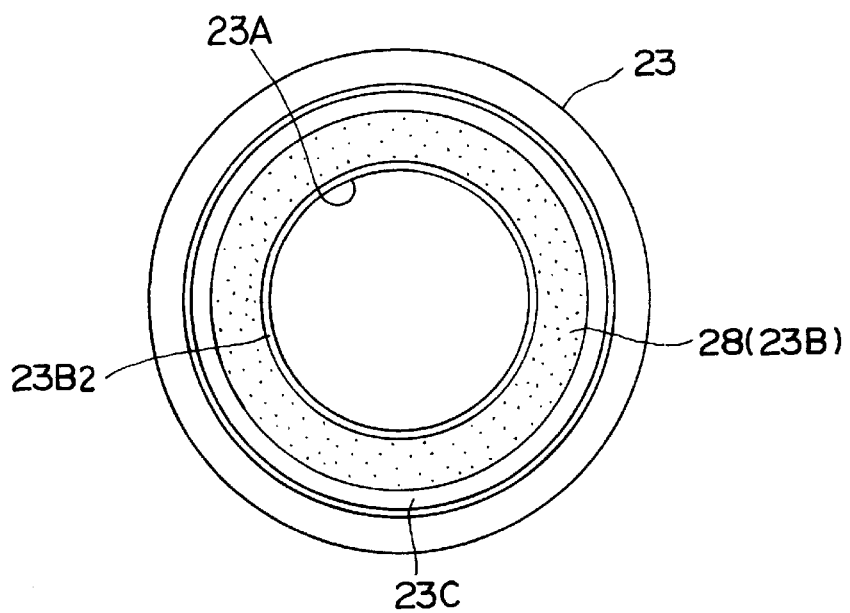
FIG. 5 is a left side view of the boss taken in the direction of arrows V—V in FIG. 4.

As seen in FIGS. 3 to 5, the boss units 23 are each in the form of an annular ring of cast iron or other metallic material, and are securely welded to the opposite ends of the bridge ring 24 in fitting engagement with the latter. Further, the boss units 23 are each provided with a joint pin hole 23A of a predetermined diameter, for example, of approximately 95 mm in inside diameter. As seen particularly in FIG. 3, the boss units 23 are each provided with an end face 23B on an axially outer side in confronting relation with a bracket 26. The end face 23B is provided with an annular tapered surface 23C at and around its outer marginal edges.

Furthermore, the end face 23B of each boss unit 23 is provided with a coating surface area 23B1 to be coated with a thermal spray coating layer 28, which will be described hereinafter, and an inner non-coating surface area 23B2 radially inward of the coating surface area 23B1. Thrust loads which are exerted on the bucket 9 during an excavating operation of the hydraulic power shovel are supported by end faces 26C of the brackets 26 through the thermal spray coating layers 28 and 29.

Indicated at 25 are a pair of bushes which are fitted in joint pin holes 23A in the respective boss units 23 of the arm boss 22. Each one of the bushes 25 is formed of a sintered alloy or the like and in a cylindrical shape, and set in the joint pin hole 23A of the boss unit 23 by press-in fitting.

Designated at 26 are right and left brackets which are provided in laterally spaced positions on the bucket 9. These brackets 26 are each in the form of a flat plate of steel or other metal material and located in face to face relation with each other in the axial direction of the arm boss 22. Further, the brackets 26 are each provided with a joint pin hole 26A axially in alignment with the joint pin holes 23A of the boss units 23.

Further, an annular reinforcing member 26B is securely welded to the inner side of each bracket 26 axially in alignment with the arm boss 22. As shown in FIG. 3, on the side of the boss unit 23, the reinforcing member 26B is provided with an annular end face 26C in coaxially aligned relation with the boss unit 23. The end face 26C of the bracket 26 is provided with an annular tapered surface 26D at and around its outer marginal edges.

Indicated at 27 is a joint pin which has its axially intermediate portion fitted in the bush 25 and its axially opposite end portions fitted in the joint pin holes 26A of the brackets 26 to support the arm boss 22 rotatably between the brackets 26. A left end portion of the joint pin 27 is non-rotatably fixed to the left one of the brackets 26 through an anti-rotational stopper mechanism (not shown). A lubricant such as grease is filled in the internal space between the bridge ring 24 of the arm boss 22 and the joint pin 27 in a sealed state thereby to lubricate sliding surfaces of the bush 25 and the joint pin 27.

Denoted at 28 are thermal spray coating layers on the side of the boss, which are formed on the coating surface areas 23B1 on the right and left end faces 23B of the arm boss 22 by thermal spraying a hard material More specifically, the thermal spray coating layers 28 are formed by thermal spraying a cemented carbide material with high rigidity and thermal resistance. In this instance, for example, the cemented carbide material contains powder of nickel and chromium along with tungsten carbide and thermal sprayed by means of a plasma spraying method or by a high energy spraying method. The powder of the cemented carbide material is composed of, for example, 70–90 wt % of tungsten carbide, and 10–30 wt % of nickel and chromium in a total amount.

Indicated at 29 are thermal spray coating layers which are formed by thermal spraying a hard material on the end faces 26C of the right and left brackets 26. Similarly to the thermal spray coating layers 28, the thermal spray coating layers 29 are formed by the use of a cemented carbide material as mentioned above.

Both of the thermal spray coating layers 28 and 29 constitute wear proof layers which prevent abrasive wear of or damages to end faces 23B and 26C of the arm boss 22 and brackets 26 which are held in direct sliding contact with each other as the bucket 9 is turned up and down.

Designated at 30 are dust seal rings which are fitted in the joint pin holes 23A of the boss units 23 on the outer side of the arm boss 22. These dust seal rings 30 serve to prevent dirt or other foreign matter from getting between sliding surfaces of the bushes 25 and the joint pin 27, and at the same time to distribute part of grease, which has been supplied to the just-mentioned sliding surfaces, toward the thermal spray coating layers 28 and 29 of the arm boss 22 and brackets 26.

Indicated at 31 are O-rings which are fitted on to seal gaps between the arm boss 22 and the brackets 26. Each one of the O-rings 31 is fitted across a gap between the tapered surface 23C and 26D of the arm boss 23 and a bracket 26 with a predetermined degree of interference to prevent foreign matter from getting between the arm boss 22 and the bracket 26.

With the bearing device 21 according to the present embodiment, with the arrangements as described above, at the time of driving the bucket 9 of the working mechanism 6 during an excavating operation of the power shovel, the bucket cylinder 12 is stretched out or contracted to turn the brackets 26 relative to the arm boss 22 through the joint pin 27. By so doing, the bucket 9 at the fore end of the arm 8 is turned up and down to excavate earth out of a ground.

In the case of the present embodiment having the thermal spray coating layers 28 and 29 of a hard material formed on the end faces 23B and 26C of the arm boss 22 and the brackets 26, thrust loads which are imposed on the bucket 9 as a result of collisions between the bucket 9 and earth, for example, those thrust loads are supported by the thermal spray coating layers 28 on the side of the arm boss 22 and at the same time by the thermal spray coating layers 29 on the side of the brackets 26 to prevent abrasive wear and damages which would otherwise be likely to occur to the end faces 23B and 26C of the arm boss 22 and the brackets 26. Besides, when grains of earth which have happened to get between the end faces 23B and 26C of the arm boss 22 and the brackets 26 can be crushed between the thermal spray coating layers 28 and 29 to prevent abrasive wear of the end faces 23B and 26C.

Now, described below with reference to FIGS. 6 to 10 is a method for manufacturing the arm boss 22 as a whole, including a method forming the thermal spray coating layers on the boss according to the present embodiment.

Figure 6:
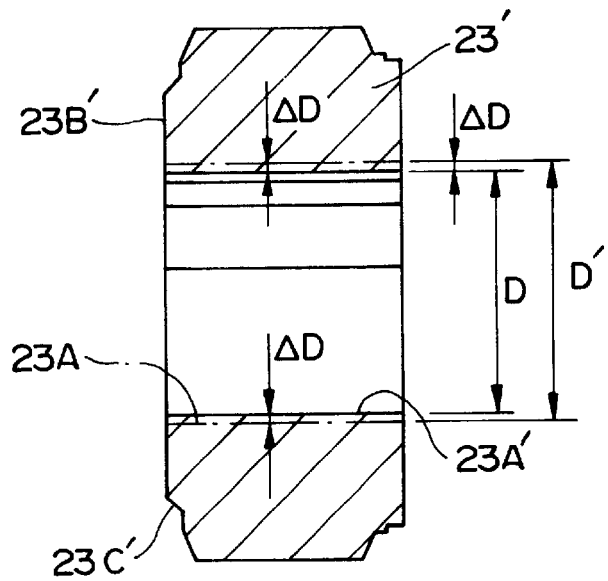
FIG. 6 is a sectional view of a structural base material for a boss unit, obtained in a preparatory machining stage.

Firstly, in a preparatory stage shown in FIG. 6, a structural base material 23' for the boss unit 23 is prepared from cast iron material. The structural base material 23', which is an original structural base material for a boss unit 23, includes an original hole 23A', end face 23B' and tapered surface 23C' of approximately predetermined dimensions.

In this instance, the structural base material 23' for a boss unit 23 contains an original hole 23A' to be machined into the joint pin hole 23A in a later stage. For example, the original hole 23A' has a diameter D of approximately 85 mm. Accordingly, in case the diameter D' of the ultimate joint pin hole 23A is 95 mm, the original hole 23A' has a machining margin or a machining allowance range AD of approximately 5 mm in the radial direction ($\Delta D=(D'-D)/2$).

Figure 7:
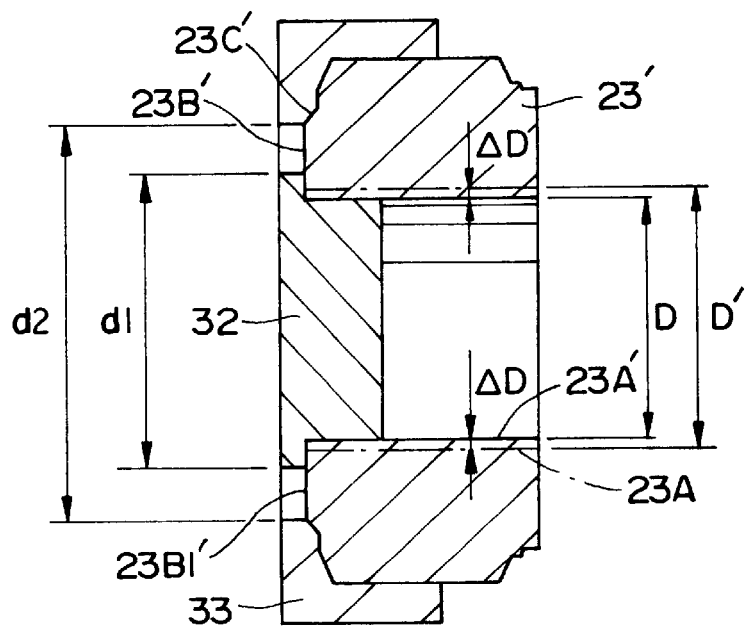
FIG. 7 is a sectional view of the structural base material for a boss unit, fitted with inner and outer masking members.

Turning now to FIG. 7, there is shown a masking stage in which, except the coating surface area 23B1', the end face 23B' of the structural base material 23' is masked by the use of an inner masking member 32 in the form of a stepped cylinder with a flange and an outer masking member 33 in the shape of a ring with an annular bottom portion. For this purpose, the inner masking member 32, having a stepped cylindrical body with a flange of an outer diameter d1 (e.g., d1=105 mm) which is larger than the diameter D' of the original joint pin hole 23A, is fitted in the original hole 23A' of the structural base material 23' for a boss unit in the first place. Upon fitting the inner masking member 32 in the structural base material 23' for a boss unit, the end face 23B' of the latter is masked by the masking member 32 at radially inner surface areas which correspond to the machining allowance $\Delta D$ and marginal surface areas which circumvent the machining allowance range $\Delta D$.

Then, the ring-like outer masking member 33, having an annular bottom portion with an inside diameter d2 (e.g., d2=152 mm) which corresponds to the diameter of the end face 23B', is fitted on the structural base material 23' for a boss unit. The inside diameter d2 of the structural base material 23' corresponds to the diameter of a border between the end face 23B' and the annular tapered surface 23C' on the side of the structural base material 23'. As a result, outer peripheral surfaces of the structural base material 23' is masked by the outer masking member 33, including the tapered surface 23C'. Thus, the end face 23B' of the structural base material 23' is masked except the coating surface area 23B1 which is exposed between the outer diameter d1 of the inner masking member 32 and the inside diameter d2 of the outer masking member 33.

Figure 8:
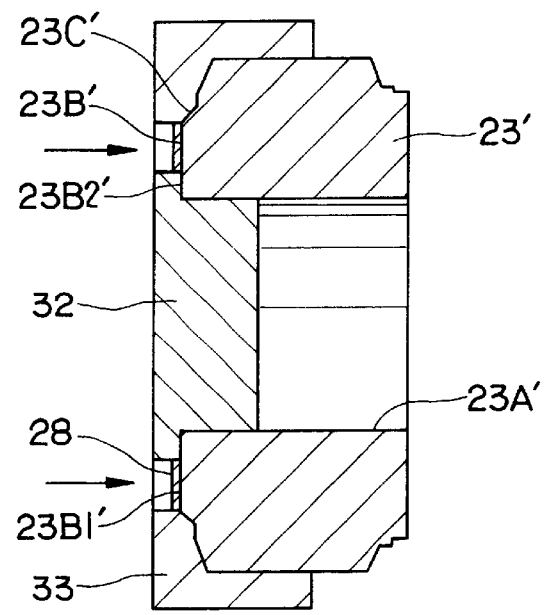
FIG. 8 is a sectional view of the annular structural base material having a thermal spray coating layer formed on one end face in a thermal spray coating stage.

In a next thermal spray coating stage shown in FIG. 8, a thermal spray coating layer 28 is formed on the coating surface area 23B1' on the end face 23B' of the structural base material 23' between the Inner and outer masking members 32 and 33 by thermal spraying a cemented carbide material which contains tungsten carbide as a major component, as indicated by an arrow in FIG. 8. By this thermal spray coating operation, the cemented carbide material is coated only on the coating surface area 23B1' of the end face 23B' of the structural base material 23', leaving uncoated or exposed other surface areas including the inner non-coating surface area 23B2' which is provided around the original joint pin hole and radially inward of the coating surface area 23B1'.

Figure 9:
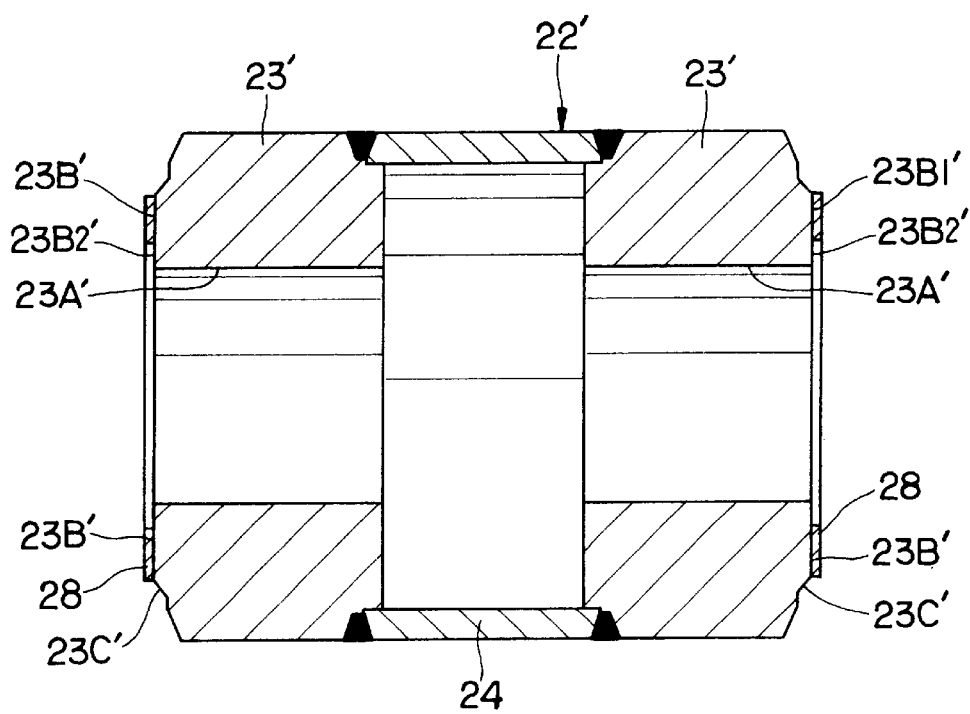
FIG. 9 is a sectional view of a couple of boss units welded to each other through a bridge ring in a first welding stage.

Following the above-described thermal spray coating stage is a first welding stage as shown in FIG. 9, in which a couple of structural base materials 23', each with a thermal spray coating layer 28, are welded to each other by welding them to the opposite ends of a bridge ring 24 to make an arm boss 22'. In a second welding stage shown in FIG. 10, the arm boss 22' is welded to fore end portions of upper and lower flanges 8A and right and left webs 8B of an arm 8.

In a final machining stage shown in FIG. 10, the original holes 23A' in the structural base material 23' of the boss 22, which is welded to the arm 8, are each machined to a specified diameter by the use of a cutting tool, removing the stock of the structural base material 23' to an extent corresponding to the machining margin or a machining allowance range ΔD and thereby shaping each one of the original holes 23A' into a joint pin hole 23A of a predetermined diameter as indicated by one-dot chain line in FIG. 10. Accordingly, the arm boss now has the machined joint pin hole 23A in the same manner as in FIG. 2 except that it is not yet assembled with the bushes 25, brackets 26 and joint pin 27.

In this instance, as described above, the end face 23B' of each unit of structural base material 23' is provided with a non-coating surface area 23B2' around the original hole approximately in a breadth corresponding to the machining allowance range ΔD. Therefore, at the time of machining the original hole 23A' into the joint pin hole 23A by the use of a cutting tool in the final machining stage, there is no necessity for removing part of the thermal spray coating layer 28 which is harder than the structural base body 23'. Namely, the original hole 23A' be machined into a joint pin hole 23A of a specified diameter quite easily by the use of a cutting tool.

Consequently, the original hole 23A' in the structural base material or base body 23' can be machined free of cracking or exfoliation troubles which would otherwise occur to the thermal spray coating layer 28 as explained hereinbefore in connection with the prior art. This of course makes it possible to enhance the performance quality and reliability of the thermal spray coating layers 28. Further, the service life of the cutting tool can be prolonged to a marked degree because there is no need any more for removing part of hard coated layers of cemented carbide layer.

Moreover, according to the present embodiment, the inner non-coating surface area 23B2 on the end face 23B of the structural base material 23' is arranged to have a breadth which includes outer marginal portions of the machining allowance range ΔD. Therefore, even in a case where a tolerance is set at a relatively large value in machining the original hole 23A', the machining operation can be completed without necessitating to remove part of the thermal spray coating layer 28 along with the stock of the structural base material 23A' to preclude the possibilities of cracking of the thermal spray coating layer 28.

Furthermore, in the process of fabrication of the arm boss 22, the structural base bodies 23' are welded to the bridge ring 24 and arm 8 before machining the original holes 23A'. Therefore, even if a structural base material 23' is dropped and damaged on the side of its original hole 23A', damaged portions can be removed in the following machining stage to provide a joint pin hole 23A with smooth finished surfaces.

Further, according to the present embodiment, the inner and outer masking members 32 and 33 are fitted on the inner and outer peripheral sides of a structural base material 23' in the masking stage. Namely, except the coating surface area 23B1', the end face 23B' of the structural base material 23' can be masked simply by fitting two masking members in or on the structural base material 23', easily in an efficient manner as compared with masking by the use of masking tapes or the like.

Figure 11:
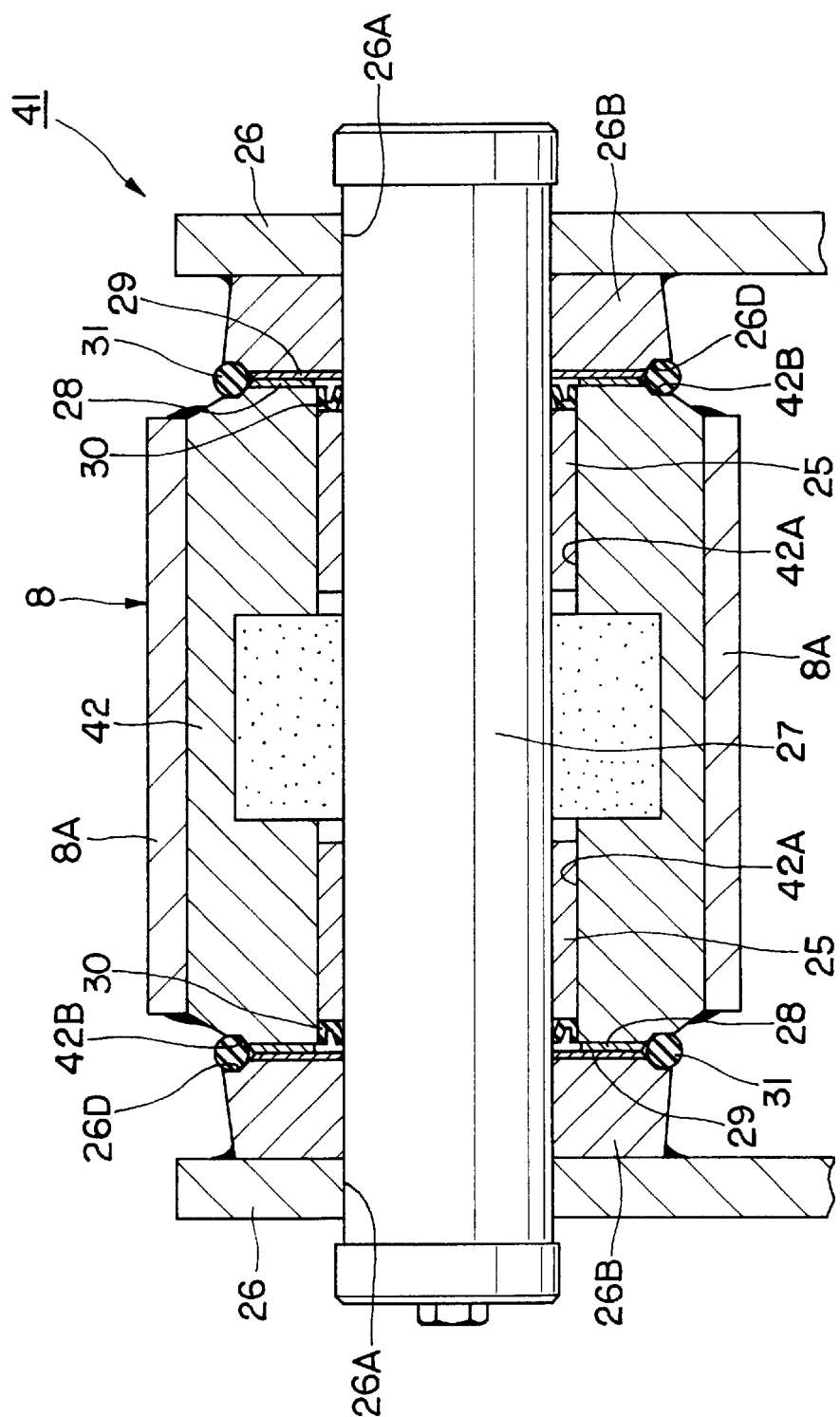
FIG. 11 is a sectional view of a first modification according to the present invention, taken in the same direction as in FIG. 2.

In the case of the present embodiment, the arm boss 22 of the bearing device 21 is constituted by a couple of boss units 23 and one bridge ring 24. However, it is to be understood that the present invention is not limited to this particular form of arm boss. For example, as in a first modification shown in FIG. 11, an arm boss 42 of a bearing device 41 may be constituted by a single boss unit 42 with a thermal spray coating layer 28 of cemented carbide on each end face.

In this instance, similarly to the boss units 23 of the foregoing embodiment, the arm boss 42 of the first modification is provided with joint pin holes 42A and tapered surfaces 42B.

Figure 12:
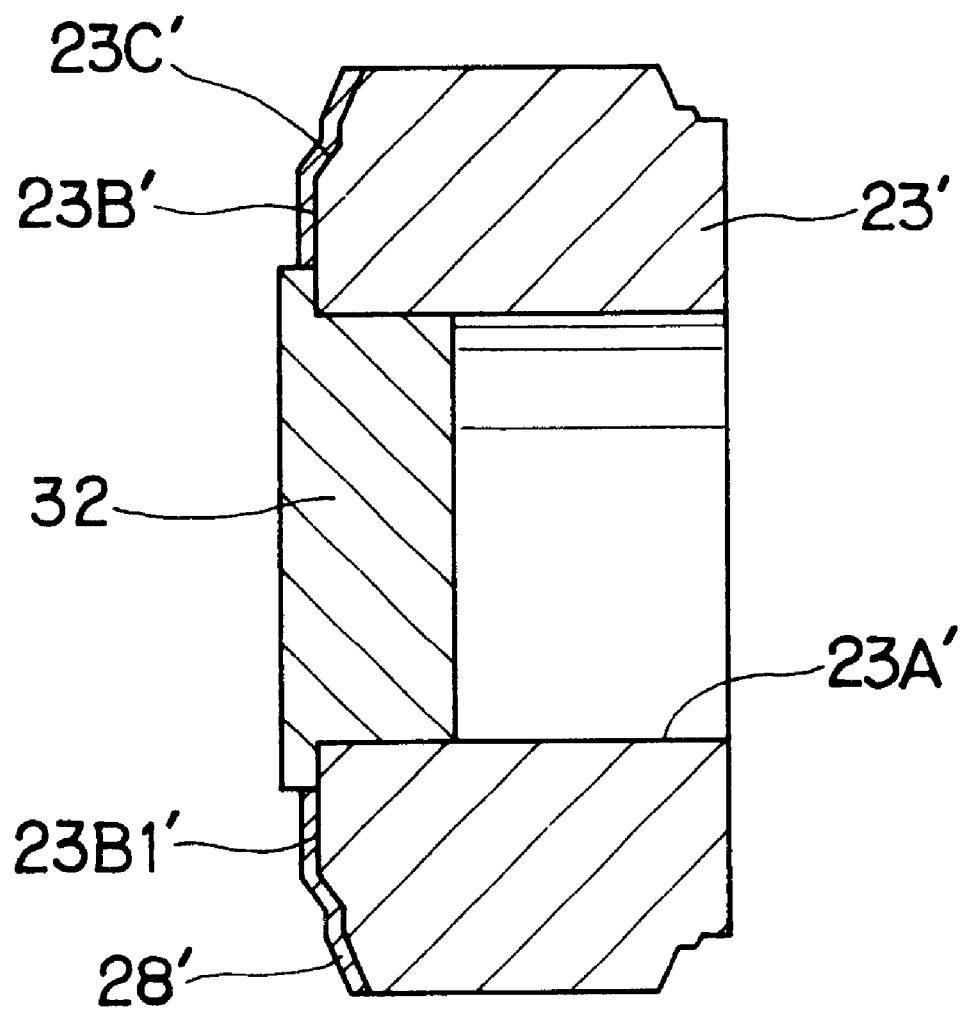
FIG. 12 is a sectional view similar to FIG. 7, showing a masking stage in a second modification according to the present invention.

Further, in the masking stage, the present embodiment employs the inner and outer masking members 32 and 33 which are adapted to fit in or on the inner and outer peripheral sides of a structural base material 23' for a boss unit. However, of the two masking members, the outer masking member 33 can be dispensed with as in a second modification shown in FIG. 12. Even in this case, a thermal spray coating layer 28' of cemented carbide can be formed on an annular coating surface area 23B1' on an end face 23B' of the structural base material 23', on the outer side of the inner masking member 32. However, in this case, a thermal spray coating layer 28' is formed also on a tapered surface 23C' of a coating surface area 23B1' on the end face 23B.

Further, in the above-described embodiment, cemented carbide material containing tungsten carbide as a major component is employed by way of example in forming the thermal spray coating layers 28 and 29. However, the present invention is not limited to cemented carbide material of this sort. For instance, the thermal spray coating layers may be formed by the use of other cemented carbide material containing molybdenum as a major component or by the use of ceramic material containing silicon carbide, titanium carbide, alumina and chromium oxide as major components.

Furthermore, although the bearing device of the present invention is applied to a pivotal pin joint between the arm 8 and the bucket 9 of the working mechanism in the above-described embodiments, it can be applied similarly to other pin joint portions, for example, to a pin joint portion between the boom 7 and the arm 8 or between the revolving frame 3 and the boom 7, or to other pivotal pin joint portions on hydraulic cranes or other construction machines or on other agricultural or industrial machines.

Industrial Applicability

As clear from the foregoing particular description, according to the present invention, before forming a thermal spray coating layer on an end face of a bearing boss, the end face of an annular structural base material to be machined into a bearing boss is masked on a surface area falling in an allowance range of a machining operation by which an original hole in the structural base material is shaped into a joint pin hole of a predetermined diameter in a later stage subsequently to thermal spray coating the end face of the bearing boss. Accordingly, a thermal spray coating layer is not formed in a surface area corresponding to an allowance of a machining operation by which the original hole in the structural base material is shaped into a joint pin hole of a specified diameter in a later stage.

According to the above-described arrangements, at the time of machining an original hole in a structural base material for a boss unit into a joint pin hole, there is no necessity for removing part of the thermal spray coating layer on the end face of the structural base material. It follows that the original hole can be machined easily by the use of a cutting tool, free of the cracking and defoliation troubles which occur to and detrimentally impair the quality of the thermal spray coating layers as in the case of the prior art mentioned hereinbefore. Besides, the cutting tool can enjoy a prolonged service life because it is not required to cut the hard thermal spray coating layers Further, according to the present invention, prior to thermal spray coating an end face of a structural base material for a boss unit, an inner masking member is fitted in an original hole in the structural base material thereby to mask surface areas of the end face of the structural base material radially inward of an annular coating surface. Therefore, surface areas of the end face, except a predetermined coating area, can be masked simply by fitting one inner masking member in the structural base material. Thus, the masking of the structural base material can be completed efficiently and in a facilitated manner.

Further, according to the present invention, prior to thermal spraying coating and end face of a structural base material for a boss unit, an inner masking member is fitted in an original hole in the structural base material while an outer masking member is fitted on the outer peripheral side of the structural base material to mask surface areas on the end face of the structural base material which are radially on the inner and outer side of a predetermined annular coating area. In this case, the end face of the structural base material can also be masked easily upon fitting the inner and outer masking members on the inner and outer peripheral sides of the structural base material. Thus, the masking of the structural base material can also be completed efficiently and in a facilitated manner by the use of the inner and outer masking members.

Further, according to the present invention, the inner masking member to be fitted in a structural base material for a boss unit is arranged to have an outside diameter which is larger than a joint pin hole which is ultimately formed by machining an original hole in the structural base material, that is, larger than an allowance range in machining the joint pin hole. Therefore, a surface area which corresponds to the allowance range of the machining operation is left as a non-coating area free of the thermal spray coating layer. It follows that, at the time of machining an original hole in the structural base material into a final joint pin hole by the use of a cutting tool, there is no necessity for removing part of the thermal spray coating along with stock of the structural base material. That is to say, the original hole in the structural base material can be easily machined by the use of a cutting tool.

What is claimed is:

1. A method for manufacturing a bearing boss with a thermal spray coating layer, comprising the steps of:
   preparing a structural base material for a boss, said structural base material having an annular body and containing an original hole to be ultimately formed into a joint pin hole of a predetermined diameter;
   fitting an inner masking member in said original hole in said structural base material to mask an end face of said structural base material on surface areas corresponding to an allowance range of a machining operation to be performed on said original hole; and
   forming a thermal spray coating layer on unmasked surface areas on said end face of said structural base material by the use of hard material;
   said inner masking member having an outside diameter larger than a joint pin hole to be ultimately formed by machining said original hole in said structural base material.

2. A method for manufacturing a bearing boss with a thermal spray coating layer as defined in claim 1, wherein said thermal spray coating layer is formed on said end face of said structural base material on an annular surface area radially on the outer side of said inner masking member.

3. A method for manufacturing a bearing boss with a thermal spray coating layer as defined in claim 1, wherein in addition to said inner masking member, an outer masking member is fitted on an outer peripheral side of said structural base material at the time of masking said end face, and said thermal spray coating layer is formed on said end face on an annular surface area between said inner and outer masking members.

4. A method for manufacturing a bearing boss with a thermal spray coating layer as defined in claim 1, wherein said inner masking member is arranged to have an outside diameter larger than the diameter of an allowance range in a machining operation by which said original hole in said structural base material is ultimately formed into a joint pin hole of a predetermined diameter.

5. A method for manufacturing a bearing boss with a thermal spray coating layer as defined in claim 2, wherein said inner masking member is arranged to have an outside diameter larger than the diameter of an allowance range in a machining operation by which said original hole in said structural base material is ultimately formed into a joint pin hole of a predetermined diameter.

6. A method for manufacturing a bearing boss with a thermal spray coating layer as defined in claim 3, wherein said inner masking member is arranged to have an outside diameter larger than the diameter of an allowance range in a machining operation by which said original hole in said structural base material is ultimately formed into a joint pin hole of a predetermined diameter.

7. A method for manufacturing a bearing boss with a thermal spray coating layer as defined in claim 1, wherein said structural base material is of a boss to be used on a fore end portion of an arm of a construction machine as an arm boss, and said thermal spray coating layer on said end face of said structural base material serves to support thrust loads between brackets on the side of a bucket when said arm boss is connected to said brackets through a joint pin.

8. A method for manufacturing a bearing boss with a thermal spray coating layer as defined in claim 2, wherein said structural base material is of a boss to be used on a fore end portion of an arm of a construction machine as an arm boss, and said thermal spray coating layer on said end face of said structural base material serves to support thrust loads between brackets on the side of a bucket when said arm boss is connected to said brackets through a joint pin.

9. A method for manufacturing a bearing boss with a thermal spray coating layer as defined in claim 3, wherein said structural base material is of a boss to be used on a fore end portion of an arm of a construction machine as an arm boss, and said thermal spray coating layer on said end face of said structural base material serves to support thrust loads between brackets on the side of a bucket when said arm boss is connected to said brackets through a joint pin.

10. A method for manufacturing a bearing boss with a thermal spray coating layer as defined in claim 1, further comprising the step of machining said original hole in said structural base material.

11. A method for manufacturing a bearing boss with a thermal spray coating layer as defined in claim 10, wherein said thermal spray coating layer is formed on said end face of said structural base material on an annular surface area radially on the outer side of said inner masking member.

12. A method for manufacturing a bearing boss with a thermal spray coating layer as defined in claim 10, wherein in addition to said inner masking member, an outer masking member is fitted on an outer peripheral side of said structural base material at the time of masking said end face, and said thermal spray coating layer is formed on said end face on an annular surface area between said inner and outer masking members.

13. A method for manufacturing a bearing boss with a thermal spray coating layer as defined in claim 10, wherein said inner masking member is arranged to have an outside diameter larger than the diameter of an allowance range in a machining operation by which said original hole in said structural base material is ultimately formed into a joint pin hole of a predetermined diameter.

14. A method for manufacturing a bearing boss with a thermal spray coating layer as defined in claim 10, wherein said structural base material is of a boss to be used on a fore end portion of an arm of a construction machine as an arm boss, and said thermal spray coating layer on said end face of said structural base material serves to support thrust loads between brackets on the side of a bucket when said arm boss is connected to said brackets through a joint pin.

* * * * *